Patented Feb. 13, 1951

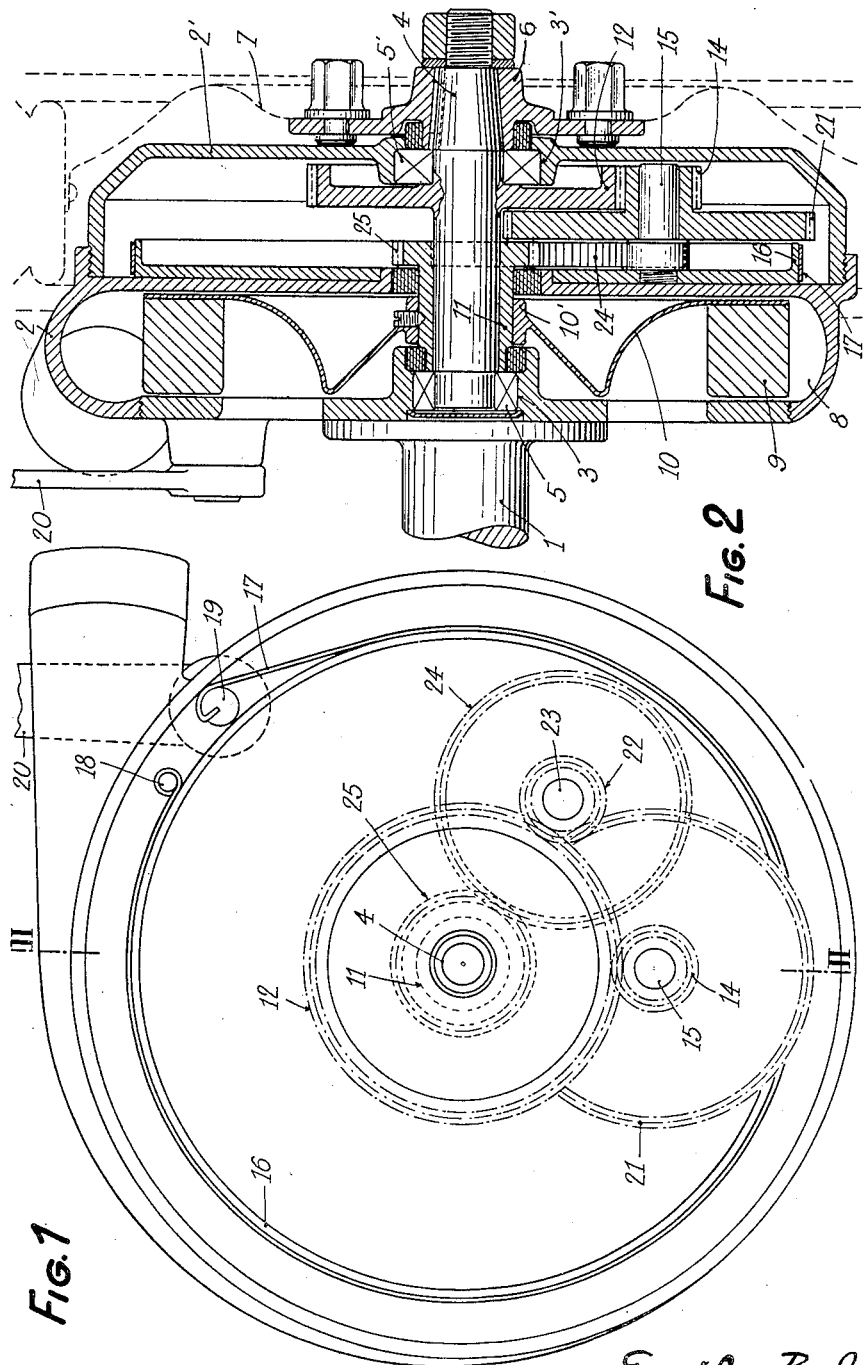

2,541,741

UNITED STATES PATENT OFFICE 2,541,741

MOUNTING OF FANS CONTROLLED BY THE ROTATION OF VEHICLE WHEELS

Emile Bobard, Beaune, France

Application February 11, 1948, Serial No. 7,674
In France February 20, 1947

4 Claims. (Cl. 230—35)

1

It has already been proposed to mount pumps, fans and like apparatus carried by vehicles inside the body of the wheel of the vehicle by which they are carried so as to be controlled automatically through the rotation of said wheel. My invention has for its object improvements in such a system applicable to the case of a fan.

According to my invention, the body of the fan and the casing for the speed multiplying gear driving the blades of the fan form a non-rotary hub for the wheel. Inside the hub an axle or spindle turns and carries a driving gear meshing with a speed multiplying gear inside the casing. My invention covers also a particular clutch system for the fan allowing it to be driven or held fast as desired when the wheel rotates.

I have shown by way of example in accompanying drawings a preferred embodiment of said invention. In said drawings:

Fig. 1 is an elevational view with the casing removed,

Fig. 2 is a cross-section along line II—II of Fig. 1.

As apparent from the drawing, a stationary axle 1 of the vehicle carries a two part casing 2—2' formed with coaxial hub elements at 3 and 3'. The hub elements carry the wheel spindle 4 through the agency of ball bearings 5 and 5'. A wheel-carrying plate 6 is keyed to the end of the spindle 4 and the wheel itself 7 (shown in dotted lines) is secured to said plate 6 in the usual manner. The casing part 2 is designed so as to form the housing of the fan; in other words it includes an inner annular chamber 8 assuming the shape of a volute or curl inside which may rotate the blades 9 of a fan carried by a disk 10 rigid with a core 10' secured to a sleeve 11 adapted to rotate round the spindle 4 and coaxially therewith.

The casing part 2' encloses a speed multiplying gear system. This gear system comprises a gear wheel 12 rigid with the spindle 4 and meshing with a pinion 14 mounted loosely on a spindle 15 which is rigid with a rotary drum-forming plate 16 coaxial with the spindle 4. To frictionally retard or to hold fast the plate 16 a metal strip 17 secured at one end to a stationary pin 18 and adapted to be contracted or expanded as desired by the spindle 19 provided for said purposes and carrying the control lever 20.

The pinion 14 is rigid with a gear wheel 21 meshing with a pinion 22 mounted loosely on an axle 23 also carried by the rotary plate 16. This pinion 22 rotates with a gear wheel 24 which is in mesh with a last pinion 25 rigid with the fan

2 blade carrying sleeve 11. Possibly a plurality of speed multiplying sets may be mounted in star formation on the plate 16 round the wheel spindle 4.

It is thus apparent that through the agency of such speed multiplying gears the comparatively slow rotation of the wheel 7 drives into rapid rotation the sleeve 11 and the blades 9 of the fan provided the plate 16 is held fast. If not, that is if the drum 16 is released and allowed to rotate freely, the system of speed-modifying gears will rotate freely without producing any significant rotation of the fan blades and hence the fan will not deliver any significant amount of air.

Of course, my invention is by no means limited to a particular type of speed reducing gears nor to a particular clutch system.

What I claim is:

1. In a vehicle, the combination of a wheel for said vehicle, a chassis for said vehicle and a fan system including a stationary two-part housing secured to the chassis, a hub arrangement rigid with said housing, a rotary spindle adapted to rotate inside said hub and rigid with the wheel, a fan adapted to rotate inside the housing coaxially with the rotary spindle, and a gear system adapted to transmit at multiplied speed the movements of the spindle to the fan blades.

2. In a vehicle, the combination of a wheel for said vehicle, a chassis for said vehicle and a fan system including a stationary two-part housing secured to the chassis, a hub arrangement rigid with said housing, a rotary spindle adapted to rotate inside said hub and rigid with the wheel, a fan adapted to rotate inside the housing coaxially with the rotary spindle and a gear system within said housing adapted to transmit at multiplied speed the movements of the spindle to the fan blades with a given speed multiplication and means for retarding the rotation of one of the elements of said gear system within said housing to make effective the speed multiplying function of said gear system.

3. In a vehicle, the combination of a wheel for said vehicle, a chassis for said vehicle and a fan system including a two-part housing secured to the chassis, a hub arrangement rigid with said housing, a rotary spindle adapted to rotate inside said hub and rigid with the wheel, a fan adapted to rotate inside the housing coaxially with the rotary spindle, and a gear system adapted to transmit the movements of the spindle to the fan blades with speed multiplication, said gear system comprising a gear wheel rigid with and carried coaxially by the wheel-carrying spindle, a support coaxial with the rotary spindle rotatable inside the casing, at least one set of speed increasing gears adapted to operatively connect the gear-wheel on the spindle with the fan and rotatably mounted on the support, and friction means operable from the outside of the housing adapted to hold the support against rotation whereby to render effective the speed increasing function of the speed increasing gear system.

4. In a vehicle, the combination of a wheel for said vehicle, a chassis for said vehicle and a fan system including a stationary two-part housing secured to the chassis, a hub arrangement rigid with said housing, a rotary spindle adapted to rotate inside said hub and rigid with the wheel, a fan adapted to rotate inside the housing coaxially with the rotary spindle, and a gear system comprising at least one pinion fixed on a rotary plate adapted to transmit the movement of the spindle to the fan blades with speed multiplication, and means for retarding the rotation of said plate to make effective said speed multiplying gear system.

EMILE BOBARD.

REFERENCES CITED

The following references are of record in the file of this patent:

UNITED STATES PATENTS

| Number | Name | Date |
|---|---|---|
| 802,175 | Seeley | Oct. 17, 1905 |
| 918,632 | Whittmer | Apr. 20, 1909 |
| 968,732 | Bergstrom | Aug. 30, 1910 |
| 1,007,920 | Clements | Nov. 7, 1911 |
| 1,059,222 | Scott | Apr. 15, 1913 |